Figure 1:
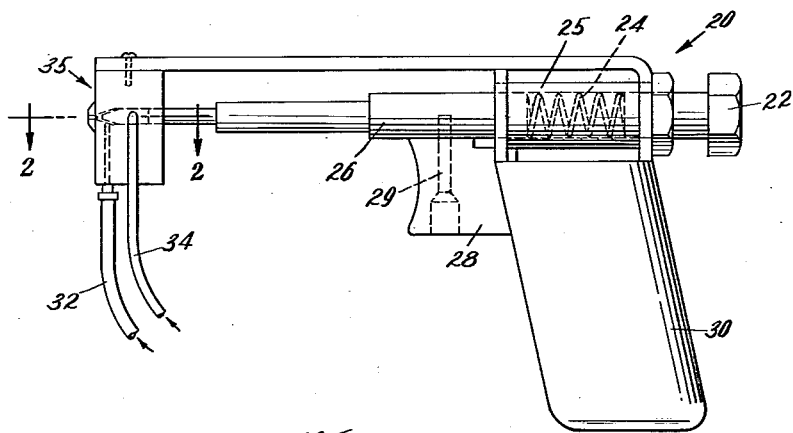

INVENTOR.
DUDLEY P. COOK

Feb. 25, 1964  D. P. COOK  3,122,326
TWO-COMPONENT SPRAY GUN
Filed July 13, 1962  3 Sheets-Sheet 2

INVENTOR.
DUDLEY P. COOK
BY
*Walter C. Kehm*
ATTORNEY

INVENTOR.
DUDLEY P. COOK
BY Walter C. Lehm
ATTORNEY

United States Patent Office 3,122,326
Patented Feb. 25, 1964

3,122,326
TWO-COMPONENT SPRAY GUN
Dudley P. Cook, Middlesex, N.J., assignor to Union Carbide Corporation, a corporation of New York
Filed July 13, 1962, Ser. No. 209,646
9 Claims. (Cl. 239—401)

This invention relates to an apparatus for the hydraulic spraying of two-component fluid streams of a thermosetting reactive nature when combined to form an infusible thermosetting mass within a short combined residence period, and which, by such reason must be combined and sprayed concurrently, or substantially so. More particularly, it relates to an apparatus adapted to spray such a system as a homogeneous mass without fouling or plugging during either sustained continuous or on-off spraying.

The spraying apparatus was particularly designed because no spraying apparatus heretofore available or known could adequately spray materials combining to form a phenolic foam made from a liquid one-step phenolic resin and a xylene-sulfonic acid catalyst. These materials when combined exhibit a residence life on the order of less than 1 second before setting to an infusible mass. Other designs are inadequate for spraying such materials because they allow such components to mix and react in contact with their respective combining compartment walls. Notwithstanding the swiftness with which the reacted mass was ejected or sprayed from other particular spraying apparatus, a gradual fouling deposit from this reaction formed and adhered to these walls in due time. This resulted in some of the following undesirable manifestations:

The fouling formed obstructions to the smooth flow of the combined materials toward the nozzle outlets of the respective combining compartments and thereby interfered detrimentally with the uniformity of combining and of spraying pattern so necessary for an acceptable foam.

Moreover, the particular phenolic foam fouling, as a result of the reactive materials mentioned above, was of a high density and resistant nature, and thereby, necessitated disassembly and cleaning of the combining compartments and nozzle outlets of the respective spraying apparatus with special tools and a prohibitive loss of time.

It is, therefore, an object of this invention to provide a spraying apparatus capable of uniformly combining and spraying such materials as the thermosetting phenolic foams described above without fouling or plugging during either sustained continuous or on-off operation.

Another object of the present invention is to provide a spraying apparatus having a well atomized spray of uniform pattern in cross-sectional density with a minimum of over-spray of highly reactive thermosetting materials.

A further object of this invention is to provide a spraying apparatus having a complete hydraulic purging of the spraying apparatus' internal surfaces in contact with the reactive materials in order to prevent any fouling deposits forming thereon during brief or sustained non-spraying periods.

Still another object is to provide a spraying apparatus which is leak-tight and economically producible, and yet, comprised of easily assembled and disassembled connections and components.

According to the present invention, these and other objects have now been provided in an improved spraying apparatus in which fouling, of the nature described hereinabove, is substantially, if not entirely, prevented by permitting only one of the fluid streams entering the combining compartment to wet its walls, thus preventing contact with said walls of reacting materials. This principle is incorporated in the spraying apparatus designs disclosed herein and is accomplished by designing the apparatus, such that, as it is actuated for spraying, the higher volume fluid stream used for the reaction is caused to enter the cylindrical combining compartment having a spraying nozzle outlet coaxially adapted thereto at one end and under pressure in order that it fill the same in vorticose flow towards and out its nozzle outlet before any part of the second fluid stream is allowed to enter. When this condition is effected, the designs disclosed herein are adapted to allow the second fluid stream, also under pressure, to enter the combining compartment by way of injection into the center of the first stream's vortex from a coaxial channel disposed within a reciprocating rod member adapted to be slidably housed within and mated with a part of the combining compartment cylindrical portion as well as with the tapered portion leading into the nozzle outlet. Before the second stream has the opportunity to be absorbed into that portion of the first stream immediately adjacent to the combining compartment's walls, and hence, react in contact therewith, the partially reacted streams have reached the nozzle outlet by having proceeded directly towards such outlet with the first stream enveloping the second stream. In passing through the nozzle outlet the combined streams are atomized as one stream. Fouling due to the reaction of the streams is prevented at the nozzle outlet by reasons of the high velocity of the discharge fluids at such construction. The complete absorption of the streams into one another substantially, if not entirely, takes place immediately after leaving the nozzle outlet through the uniform intermixing of the atomized droplets of the reactive components. Upon cessation of the actuation which caused the fluid streams to flow as described, the apparatus is adapted and arranged to initially shut off the second stream while the first stream is still flowing so that the first stream hydraulically purges the combining compartment and nozzle outlet of any residual material from the second fluid stream. The first fluid stream is then at such time arranged to be shut off when the reciprocating rod member is made to slide forward and mate with the wetted surfaces of the combining compartment immediately adjacent to the nozzle outlet hole. However, as is apparent, although the combining compartment and the nozzle outlet may be thoroughly purged by the first stream, any residual first stream material remaining therein would be adjacent to the coaxial channel of the reciprocating rod member from whence the second stream emerged. This juncture of reactive fluid materials could react to form an undesirable plug when spraying is terminated and the parts so positioned for mating. Therefore, a design is herein disclosed wherein when that portion of the combining compartment immediately adjacent to the nozzle outlet is fully occupied by and its wetted surfaces mated with the reciprocating rod member, and all streams have ceased flowing after the first fluid stream purge, a final purge is effected by the initiation of second fluid stream flow through the reciprocating rod member and its coaxial channel which is now so aligned and held as to form one continuous unbroken channel with the nozzle outlet. Hence, no junctures of reactive materials remain to form any kind of fouling or plugging particularly during sustained non-spraying periods.

The above flow sequences are accomplished by an apparatus which basically comprises a spraying nozzle means having a nozzle housing disposed about and housing a combining compartment residing therein which is coaxially disposed about a longitudinal axis running through the spraying nozzle. The combining compartment having a front spraying outlet tapered portion and a rear cylindrical cross-sectional portion, both coaxially connected. The front tapered portion towards its front-most end diminishing in cross-sectional taper magnitude and terminating into a uniform cross-sectional nozzle outlet extending longitudinally and coaxially disposed therewith. Cross-sectional magnitude of the rear cylindrical portion must be uniform in order that a mating reciprocating rod member of the same outer contour as the contour of said combining compartment may slide unobstructed in frontward and rearward directions therein. The combining compartment is further provided with a nozzle housing inlet opening communicating therein from its rear uniform cross-section portion and extending through said nozzle housing for the supply of the first fluid stream of greater volume in vortical flow towards and out the nozzle outlet. The reciprocating rod member is slidably movable and coaxially disposed within said combining compartment and adapted to be occupied and mated therein. The reciprocating rod member having a front tapered portion which is dimensionally equal and complementary with the front tapered portion of said combining compartment and adapted to mate therewith when said rod is in its front-most position. While the rear portion immediately adjacent and integral therewith is of a uniform cross-section and dimensionally equal and complementary with the rear cross-sectional portion of said combining compartment and of sufficient length to allow the closing of the nozzle housing inlet opening when the front taper portion of said reciprocating rod member is mated with the front taper portion of said combining compartment. The reciprocating rod member being further provided with a coaxial channel or annular bore therein extending longitudinally from and through its front taper portion towards the rear to a channel means arranged and adapted to communicate therewith and be supplied with the second fluid stream, when the reciprocating rod member is in its rearmost position. This second fluid stream material there travels through these channels into the combining compartment and into the vortex created by the first fluid stream and out the nozzle outlet with the first stream enveloping it. When the actuation for spraying is terminated, the reciprocating rod member is adapted to move frontward towards the mating position with the combining compartment and the channel means is adapted before said mating, to shut off the second fluid stream before shutting off the first stream. This last sequence has the effect of providing for a first fluid stream purge. In order that the fluid streams be supplied under pressure to the spraying apparatus, a pumping means and suitable connections are incorporated therewith. Actuating means are properly connected with said reciprocating rod member and adapted to actuate the same towards and away from said nozzle outlet and thereby accomplish spraying and non-spraying positions for the components comprising the apparatus.

The final purge by the second fluid stream is accomplished when the channel means communicating to the reciprocating rod member's annular bore is further adapted and arranged to have flow of the second fluid stream therethrough and out the nozzle outlet when the reciprocating rod member is in its mating position, and after both streams had initially ceased flowing, thus leaving no junctures of reactive materials to foul or plug.

Because the purging of the combining chambers in the designs disclosed herein are effected hydraulically and not mechanically as, for example, by the projection of a tip extending from the reciprocating rod member which is adapted to fit into and push out material residing in the nozzle outlet, and thereby limits the nozzle outlet length, the designs herein permit the nozzle outlet length or "land," as it is commonly called in the art, to be four or more times its diameter. By contrast, in most other spraying apparatus designs using mechanical purges, the "land" must be kept at a practical and much smaller length. Moreover, the necessary thin-edged outlets for such apparatus result in the production of much overspray accompanying the atomized discharge, and a spray pattern of irregular density resulting in a foam of irregular density and height.

Because the designs disclosed herein can have comparatively longer nozzle outlets or "lands," the spray discharges therefrom are in the form of long slim cones that are uniform in density and easily directed where desired with a minimum of overspray. This feature has thus enabled the application of a blanket of phenolic form, described herein below in Example 1, of uniform height and surface character heretofore unattainable.

This invention will now be described with reference to the accompanying drawings, in which:

FIGURE 1 is a side elevation of a spraying apparatus incorporating basic principles according to this invention.

FIGURES 2 and 3 are enlarged cross-sectional top views of the nozzle means shown generally by 35 of FIGURE 1 along line 2—2, showing spraying and non-spraying positions, respectively.

FIGURE 4 is a perspective view of the nozzle means shown generally by 35 of FIGURE 1 in a spraying position.

FIGURE 5 is a side elevation and cross-sectional view of a spraying apparatus according to this invention and a preferred embodiment thereof.

FIGURES 6 and 7 are side elevation cross-sectional views of an alternate second stream valving design for the apparatus in FIGURE 5 and is shown in spraying and non-spraying positions, respectively.

Referring now to the figures in greater detail, there is shown in FIGURE 1, spraying apparatus indicated generally at 20 and comprising a handle 30 on which is mounted a hollow cylindrical body 25 with both ends of same opened and slidably receiving at one end a reciprocating rod member 26 which is compelled forward by a compression spring 24 which is tensioned adjustably by an adjustment nut 22 in contact with the rear of said spring 24. An actuating device 28 is mounted at its upper end to plunger 26 by set screw 29. While actuating device shown here is a single trigger pull, such are best employed only with low spring closing forces. It is desired to operate with high spring closing forces of about 100 pounds or more, and hence compound mechanical linkage such as swivel-links reaching forward to a pivotal point of attachment on rod 26 are desired. With this, total movement need only be about 0.06–0.1 inch.

FIGURES 2 and 3 show an enlarged and detailed view of nozzle means 35 along section 2—2 of FIGURE 1 in spraying and non-spraying positions, respectively. The nozzle means 35 comprises a nozzle housing 36 disposed about a combining compartment 46 terminating into a nozzle outlet 48 and having a nozzle housing inlet opening 40 extending through said housing 36 for the first fluid stream. A second rear housing nozzle inlet opening 42 is disposed to the rear of said inlet 40 for the second fluid stream. Flexible hoses 32 and 34 are connected to inlets 40 and 42, respectively. Slidably occupied within said combining compartment is a reciprocating rod member 26 having a tapered head 38 of metal or plastic disposed to the front and adapted to be mated with the tapered inner wall portion 45 of said combining compartment 46 and the uniform cross-sectional wall of the said compartment 46. The tapered head 38 being further provided with a centrally located channel 44 extending longitudinally for a portion and then deviating perpendicularly therefrom and extending therethrough.

When the spraying apparatus' actuating device 28 is actuated rearward, the reciprocating rod member 26 moves in the same direction and upon moving a longitudinal distance "X" the first fluid stream via hose 32 and inlet 40 is forced under pressure into the combining compartment 46. Because the longitudinal distance "X" is smaller than the longitudinal distance "Y" the second fluid stream inlet 42 is still closed. Thus, the combining compartment 46 is occupied with the first fluid stream in vorticose flow therein and through the nozzle outlet 48 before any portion of the second fluid stream can enter. As the backward motion continues, channel 44 aligns and mates itself with inlet 42 to allow the second stream to pass therethrough under hydraulic pressure from pumping means not shown. At this point of alignment, the pressurized second fluid stream is injected through channel 44 into the center of the first stream's vortex in the combining compartment 46, and proceeds directly into and out the nozzle outlet 48 with the first fluid stream enveloping it. The walls 45 of the combining compartment 46 do not foul because only the first fluid stream wets the same and the shortness of residence time therein by the combined fluids and the laminar nature of the flow pattern thereof keep the walls 45 free from contact with any reacting fluids. However, towards the end of the nozzle outlet hole 48 reaction of the fluid components may have been initiated. Fouling or plugging does not build up during spraying in nozzle outlet 48 because of the relatively high velocity of the discharging fluids at such constriction. Upon release of the actuating device 28, the sequence of events is reversed. That is, the spring 24 gradually pushes back the reciprocating rod member 26 to a mating position as shown in FIGURE 3 and in doing so, the second fluid stream is shut off first, so that in effect, the first fluid stream hydraulically purges the nozzle outlet 48 of any residual material from the second fluid stream.

Figures 2, 3:
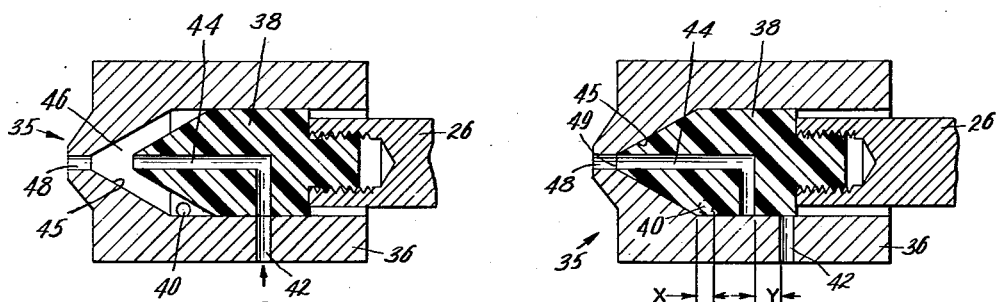
Figure 4:
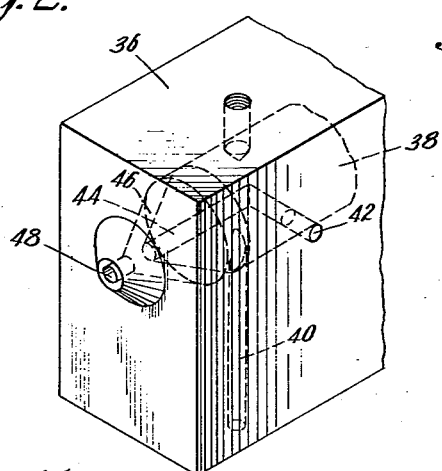

Although the above embodiment utilizing the basic principles of this invention has proven sufficiently adequate for spraying the difficult fluid materials which combine to form a phenolic foam and has remained operable through repeated very short non-spraying periods and is capable of being relatively simply put together, it does not provide for a final second fluid stream purge which, as is evident in FIGURE 3, would void the juncture 49 of dissimilar materials which can react to form a plug if the non-spraying period is of more than a few moments duration.

Figure 5:
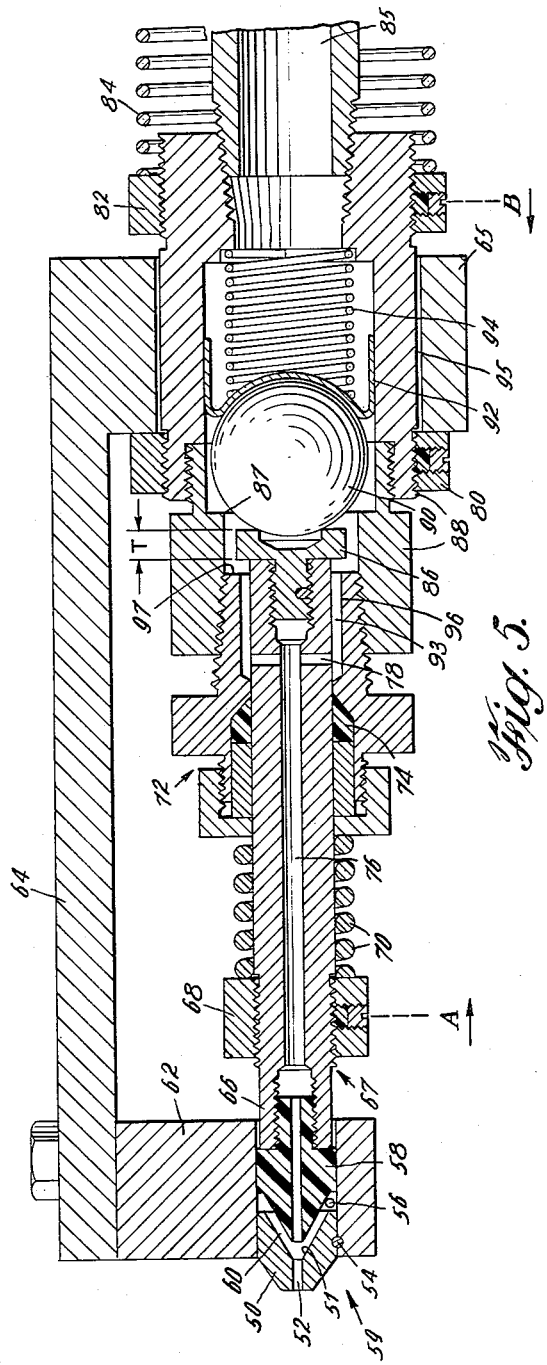

A preferred embodiment shown in FIGURE 5 provides for a final second fluid stream purge of the nozzle outlet when the parts are in a non-spraying position similar to that shown in FIGURE 3, and, as is evident, is of a more complicated and sophisticated nature. Such final purge would leave no juncture of reactive materials to form a plug.

The spraying apparatus shown in FIGURE 5 and one preferred embodiment herein comprises a rigid longitudinal frame 64 extending to the front and rear of said apparatus and disposed generally parallel to the longitudinal axis running therethrough. The front portion of said frame 64 having a generally rectangular cross section terminating in the rear into a ring portion 65 disposed generally perpendicularly therewith and containing a cylindrical bore 95 coaxial with the aforesaid longitudinal axis and adapted to support and guide and provide a contact shoulder for certain longitudinally moveable components described below. A spraying nozzle means which is shown generally by 59 is rigidly connected to and supported by the front portion of said rigid frame 64. The spraying nozzle means 59 comprises a nozzle housing 62 disposed about and housing a combining compartment 60 which is coaxially disposed about the apparatus longitudinal axis. The combining compartment 60 at its front end having a nozzle tip 50 coaxially and rigidly mounted therein by an insert fixing stake 54 or other suitable means. The inner wall portion 51 of the nozzle tip 50 within the combining chamber 60 being of a tapered conical cross-section diminishing in taper toward the front and terminating in a cylindrically shaped nozzle outlet hole 52 extending longitudinally and coaxially disposed therewith. The portion to the rear of the nozzle tip 50 throughout the remaining length of said combining compartment 60 being of a cylindrically cross-sectional shape as defined by the nozzle housing 62. The combining compartment 60 is further provided with a nozzle housing inlet 56 for the first fluid stream communicating therein from and through the nozzle housing 62 to the rear of the nozzle tip 50. This nozzle housing inlet 56 is adapted to supply said combining compartment 60 with the first fluid stream in vortical flow towards and out said nozzle outlet 52. A reciprocating rod member shown generally by 67 is slidably movable and coaxially disposed within said combining compartment 60 and adapted to be occupied and mated therein. This reciprocating rod member 67 has a front conically tipped head 58 which is dimensionally equal and complementary with the inner conical tapered wall portion 51 of the nozzle 50 and adapted to mate therewith and with the uniform cross-sectional area of the combining chamber. The conically tipped head 58 is rigidly connected to rear portion 66 of said reciprocating rod member 67, which portion 66 is of slightly smaller magnitude than that of the rear cylindrical portion of said combining compartment 60 and is of sufficient length to allow head 58 to close nozzle inlet 56 to mate with the inner tapered wall 51. The rear portion of rod member 67 serves as a pilot valve actuator, controlling the flow of the second fluid stream through the shut off valve housing 88. An end plug or capscrew 86 is screwably attached to rod member 67 and is adapted to contact and unseat the ball shaped plug 90 from its seat 87 when in fully retracted position. The reciprocating rod member 67 is still further provided with a coaxial channel 76 therein extending from the tapered head 58 towards the rear and communicating to another channel 78 perpendicularly deviating in course therefrom and extending out into an annulus 93 coaxial with the longitudinal axis of the rod. The annulus 93 corresponds in function to inlet 42 of the modification of FIGURE 2, and serves as an inlet to the channels 78 and 76 in the reciprocating rod member 67. A spring stop-actuating link connector ring 68 is screwably, rigidly, and coaxially mounted on reciprocating rod member 67 at the rear of front portion 66 and adapted to actuate the same from point "A" when a rearward force is applied thereat by linkage not shown. Disposed to the rear of ring member 68 and abutting against thereto is a reciprocating rod member spring 70 coaxially mounted about the rear portion 66 of said reciprocating rod. Said reciprocating rod member spring 70 at its rearward and opposite end abuts against a reciprocating rod member gland 72 having packing 74 and coaxially and slidably mounted about the rear portion 66 of said reciprocating rod member 67. Disposed to the rear of said reciprocating rod member gland 72 and screwably, rigidly, and coaxially mounted thereupon is a valve housing 88 extending to the rear which is coaxially disposed about the longitudinal axis running through the apparatus and slidably housed within and supported by the cylindrical bore 95 in the rear portion 65 of said rigid frame 64. The valve housing 88 houses an internal coaxial valve bore 85 throughout its length which is adapted and arranged to permit the second fluid stream to enter therein from the rear towards channels 78 and 76. The ball-shaped plug 90 is located within said valve bore 85 and is of smaller magnitude and disposed to the rear of end plug or cap screw 86 which is adapted to contact and unseat it when the reciprocating rod member 67 is in its rearmost position. This ball shaped plug 90 is urged forward, by the combination of a perforated spring alignment cage 92 and valve compression spring 94 disposed to its rear, to a seat 87 extending within the valve bore 85 and located towards the front of said plug 90. When the plug 90 is positioned in its seat 87 it prevents the second fluid stream from entering from the rear of said valve bore 85 to pass therethrough. A valve opening-time adjustment ring 80 is screwably, rigidly, and coaxially mounted about said valve housing 88 to the rear of said reciprocating rod member gland 72 while in front of the front portion of said ring 65 and adapted to contact the same when the reciprocating rod member 67 is at least a sufficient distance to the rear to open the nozzle housing inlet 56. A valve housing compression spring 84 is coaxially mounted to the rearmost portion of said valve housing 88 and adapted to force and insure the mating of the thermoplastic head 58 to the inner conically tapered wall portion 51 when the actuation from point "A" ceases. Pumping means, and connections, not shown, would be connected up with a nozzle housing inlet 56, and the rearmost portion of valve bore 85, to supply them with the fluid materials. A rear actuating link connector ring 82 is screwably, rigidly and coaxially mounted about said valve housing 88 to the rear of the ring 65 of said rigid frame 64, and adapted to provide for a final second fluid stream purge when the thermoplastic head 58 is mounted against nozzle tip 50 and ring 82 is actuated towards the front from point "B" by linkage not shown.

The diameter of the head of capscrew 86 is greater than the diameter of bore 96 in rod gland 72 and therefore serves to stop the forward movement of rod member 67 by abutting against shoulder 97 of rod gland 72.

The thickness "t" of said "head" of capscrew 86 is so made and adjusted that forward movement of rod member 67 is stopped immediately after the ball shaped plug 90 is fully seated in seat 87. In practice, this means adjusting thickness "t" of said "head" of capscrew 86 so that rod member 67 may move forward no more than .010 (ten one-thousandths) inch after ball shaped plug 90 has fully seated in seat 87.

This limitation of rod movement after the seating of the ball shaped plug minimizes the amount of resin and/or air that will be sucked into channel 76 to compensate for the volume displaced by rod member 67 as it slides away from seated ball shaped plug 90. The minimal amount of resin and/or air that is sucked into the forward end of channel 76 will be expelled therefrom by the second fluid stream purge which will be initiated immediately following every cessation of spraying of greater than momentary duration.

The further forward movement of rod member 67 necessary to seat thermoplastic head 58 against nozzle tip 50, after such movement relative to the rod gland 72 is stopped in the aforesaid manner, is accomplished by the force of spring 84 which exerts a forward moving force on the entire assembly composed of connector ring 82, valve body 88, rod gland 72 and rod member 67 with all component parts rigidly assembled thereto or housed therein.

Although slidably mounted within rod gland 72, rod member 67 moves forward as though rigidly assembled to the rod gland 72 because rod member spring 70 is made and adjusted to be stronger than valve body spring 84. Thus, spring 84 controls the starting and stopping of first stream flow through inlet 56, whereas rod member spring 70 controls starting and stopping of second stream flow past valve plug 90 and its seat 87. The purpose of the relatively weak spring 94 is merely to keep ball shaped plug 90 in contact with its seat 87 when the fully forward position of rod member 67 permits such contact.

In operation, the parts above-described so cooperate that upon the rearward actuation from point "A" by linkage not shown, force is exerted upon spring stop-actuating ring connector 68 which causes the same to move to the rear along with reciprocating rod member spring 70, gland 72, valve housing 88 and connector ring-spring stop 82 at the same time compressing spring 84, which is weaker than spring 70, until nozzle inlet 56 is open permitting the first stream to sweep into the combining compartment 60 in vortical flow towards the nozzle tip 50 and out its nozzle outlet 52. The parts just described continue to move rearward unobstructed in rearward motion until the valve opening-time adjustment ring 80 contacts the front portion of ring 65 of said frame 64 which as a result thereof prevents further rearward motion of valve housing 88 and gland 72 but permits ring member 68 to continue to force the reciprocating rod member 67 in rearward motion by virtue of its slidable relationship to gland 72 while said ring member 68 now compresses the reciprocating rod member spring 70 against gland 72. The motion of the reciprocating rod member is adjusted thereafter to continue until it contacts the ball shaped plug 90 within the valve bore 85 moving it from its seat 87 against the tension of the valve bore spring 94, and, thereby, permitting the second fluid stream to flow about said ball shaped plug 90 and past the capscrew 86 through inlet 93 into channels 78 and 76. This material flows through these channels towards the nozzle tip 50 into a vortex of the first fluid stream material which is vortically flowing towards and through the nozzle outlet 52. In passing through the long outlet 52, both streams combine and upon discharging are atomized. As is evident, the duration of time necessary to initiate flow of the first fluid stream into the combining chamber 60 is directly related to the movement of the reciprocating rod member 67 to the rear, while the duration of time for the introduction of the second fluid stream into the same combining chamber 60 is adjustable with respect to said rod member's movement by means of varying the position of valve opening-time adjustment ring 80 in relation to the ring 65.

When the rearward actuation from point "A" ceases, the sequence described hereinabove occurs in reverse with the reciprocating rod spring 70 forcing, by virtue of its relations to the other parts the reciprocating rod member 67 and its capscrew 86 to move forward toward nozzle tip 50 until "head" of capscrew 86 abuts against gland shoulder 97. This limited amount of forward movement by the rod member 67 has allowed ball plug 90 to return to its seat 87 thus stopping second fluid stream flow. At this moment, inlet 56 is still uncovered by thermoplastic head 58 and thus the flow of first stream fluid continues through nozzle outlet 52 and carrying with it any remnant of second stream fluid present in the combining compartment 60 or nozzle outlet 52.

As the rearward actuation from point "A" further ceases, valve body spring 84 forces into forward movement the valve body connector ring-spring stop 82, valve body 88, rod gland 72 and rod member 67 with its thermoplastic head 58 and all other rigidly connected or internally housed parts until thermoplastic head 58 is fully mated against the inner walls 51 of nozzle tip 50. Throughout this forward movement caused by spring 84, rod member 67 retains its full forward position in respect to rod gland 72 because rod spring 70 which forces rod member 67 to said forward position is stronger than spring 84. Thus, first stream flow is terminated by the motions caused by spring 84 following the termination of second stream flow by the motions caused by spring 70.

A final second fluid stream purge, when all the fluid streams have ceased flowing and the apparatus is in its mating position, would purge the nozzle outlet 52 and rod channel 76 of any residual first fluid stream material and/or air found therein and thus eliminate any source of fouling or plugging during lengthy non-spraying periods from reaction with the second fluid stream material always present in rod channel 76. Of course, non-spraying periods of short duration might permit the breaking of a plug formed by reaction of the materials comprising the fluid streams when spraying is again initiated, however, as is obvious, this would present precarious situations. It is for this reason that final second fluid stream purge is recommended and provided in the preferred embodiment of a spraying apparatus utilizing the basic principles recited herein. In FIGURE 5 such a final purge is attainable by the frontward actuation of actuating ring connecter member 82 from point "B," by linkage not shown, when the thermoplastic head 58 is mated against the inner conical tapered wall portion 51 of said nozzle tip 50. In operation, upon the forward actuation from point "B" this force is transmitted to the rear actuating ring connecter member 82 which moves frontward and by virtue of the connections described above causes the valve housing 88 and gland 72 to move forward thereto compressing reciprocating rod member spring 70 against the spring stop-actuating link connecter ring member 68. As this frontward motion continues to the front, capscrew 86 finally contacts ball plug 90 and unseats it, and thereby, permits the second fluid stream in the valve bore 85 to flow about said plug 90 and into channels 78 and 76 and out the nozzle outlet 56. Because the thermoplastic head 58 is mated against the inner conically tapered wall portion 51 of said nozzle tip 50 only the nozzle outlet 52 is wetted by the second fluid stream and no junctures of reactive materials remain. There is now no source for fouling or plugging. Upon release of the actuating force at point "B" the above sequence just described occurs in reverse with reciprocating rod spring 70 forcing back gland 72 and valve housing 88 until the ball shaped plug 90 is again not in contact with capscrew 86 and is positioned against its seat 87 at which time the flow of second fluid stream ceases.

Figure 6:
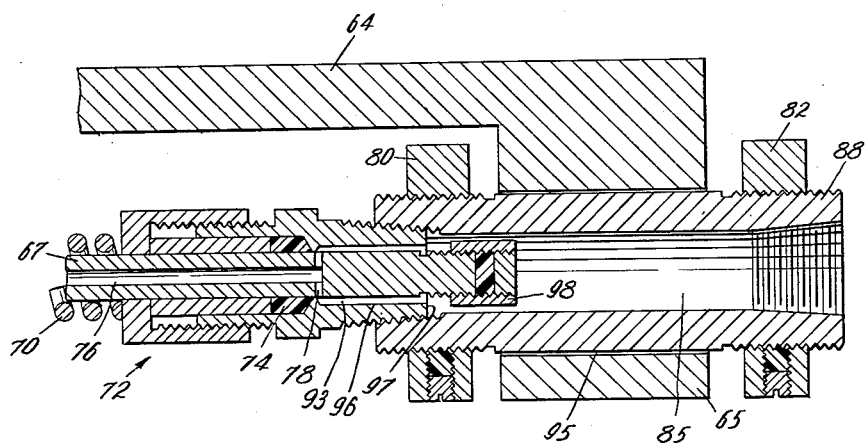
Figure 7:
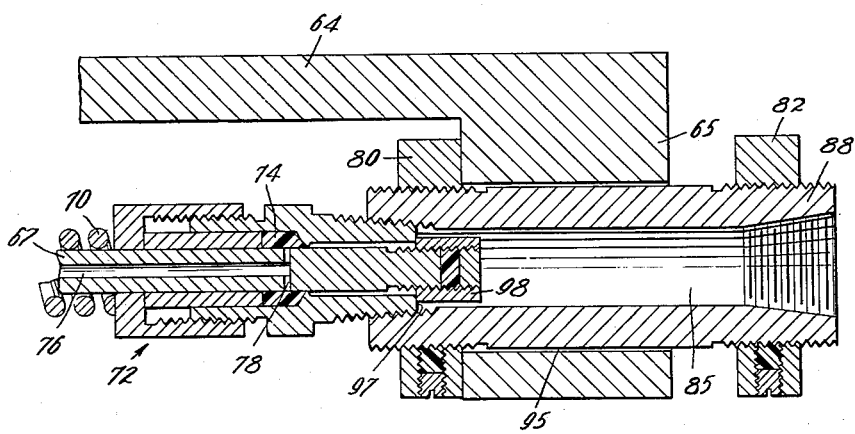

An alternate valve arrangement for FIGURE 5 is shown in FIGURES 6 and 7, in spraying and non-spraying positions, respectively. This modified valve arrangement has a slidable reciprocating rod member 67, with a stop collar 98 attached to the rearmost portion of said reciprocating rod member. The valving is accomplished by the position of channel 78 which communicates to channel 76 and which, when positioned sufficiently to the rear, allows the fluid material within the valve bore 85 to enter channel 76.

In operation, as the reciprocating rod member 67 is actuated a fixed distance towards the rear and opens the first fluid stream nozzle housing inlet at the nozzle means but said distance not sufficient to have channel 78 exposed to the second fluid stream material in valve bore 85, the first fluid stream enters the spraying apparatus essentially as described above for FIGURE 5. Further rearward movement of the reciprocating rod member 67 finally permits channel 78 to communicate to the second stream fluid material in the valve bore 85, thereby, permitting it to communicate to channel 76 and into the vortex created by the first fluid stream. Cessation of the rearward actuation reverses this sequence, shutting off the second fluid stream before reciprocating rod member 67 moves sufficiently forward to shut off the first fluid stream, thus again providing a first fluid stream purge. When the first fluid stream has ceased flowing and the apparatus is in a non-spraying and mating position as described above in FIGURE 5, the valve housing 88 can similarly be actuated frontward to expose channel 78 to the second fluid stream in the valve bore 85 for a final second fluid stream purge of the nozzle outlet.

The following illustrative example given uses a spraying apparatus incorporating some of the basic combining principles of this invention as embodied in the spraying apparatus substantially as disclosed in FIGURES 1, 2, 3 and 4, and described hereinabove.

*Example I*

A liquid phenolic resin preblend was selected as the resin first fluid stream material and consisted of 100 parts by weight of the one-step liquid phenolic resin plus 3 parts weight of methylene chloride plus 1 part by weight of an anionic surfactant.

As the acid catalyst or hardener, an acid preblend second fluid stream material was used consisting of 6 parts by weight of xylene sulfonic acid plus 1 part by weight of methylene chloride. The resin preblend and the acid preblend were pumped by separate metering pumps to the spraying apparatus through flexible Teflon lined hoses. These pumps were so geared together that the acid preblend volume was 19.1 parts per 100 parts of resin preblend volume. By weight, this ratio was 20.2 parts to 100 parts, respectively. The resin preblend hose had an internal heating element therein and maintained a resin temperature of about 65° C. and a viscosity of about 100 centipoises. The acid preblend chamber and viscosity were about 30° C. and 100 centipoises, respectively. The resin and acid preblend pressures at the apparatus were 700 p.s.i. with a theoretical pumping output (total) of 100 lbs./hr. Theoretical formulation as sprayed consisted of by weight, 100 parts resin, 5.5 parts methylene chloride, 1 part of surfactant and 15 parts of acid.

The spraying apparatus was substantially as shown in FIGURES 1, 2, 3 and 4 and having at the front end of the reciprocating rod member 26 a polychlorotrifluoroethylene thermoplastic head 38 attached to the front portion thereof. This apparatus was used to spray a 1.3 inch layer of the phenolic material between the studs of a mock-up wall cavity, 3½ in. deep and 11 in. wide x 90 in. long, with good uniformity and thickness on the bottom of said cavity. Many momentary stops and resumptions of spraying were accomplished without fouling or plugging. This foam as applied was judged fully satisfactorily as insulation. This design was completely satisfactory for spraying continuously and for non-spraying durations of one minute or more. However, this design did not have the final second stream fluid purge as embodied in the preferred designs as indicated in FIGURES 5, 6 and 7, and therefore, was not expected to prevent plugging or fouling from taking place during sustained non-spraying periods. In fact, during a non-spraying duration of approximately 1 hour, the nozzle outlet became plugged.

Variations and modifications of the designs disclosed herein for particular or optimized results can readily be determined by those skilled in this art. For example: The coaxial channels within the reciprocating rod members may be modified so as to create turbulence therein as the second fluid stream material leaves the reciprocating rod member into the vortex of the first fluid stream; and, thereby, increase the mixing of the merging fluid streams in the combining chambers. Incorporated within this channel may be a torpedo structure of smaller magnitude than said channel and extending beyond it toward the front and into the combining compartment. This torpedo can be knurled, threaded, twisted, bent, or otherwise deformed, and seated within said channel by fins extending from the same against the walls of the reciprocating rod's channel.

Variations in nozzle outlet length and diameter cause variation, among other things, in mixing and spraying patterns for any one particular system. Hence, for a particular system, the best length to diameter ratio would have to be established. Variations in nozzle outlet diameter would, for example, change the spraying output and the pressure needed to atomize such material and could also provide turbulent flow, thus hydraulic mixing under optimum conditions for avoiding fouling.

Changes in the tapered portion of the nozzle means with regard to the best angles permitting non-fouling and plugging during spraying and the most effective distance between the front most portion of the reciprocating rod member and the beginning of the nozzle housing inlet during spraying could easily be determined.

The thermoplastic head may be eliminated by steel rod to steel nozzle tip direct contact (via lapped tapered portion) immediately adjacent to nozzle outlet 52. This would likely be a more trouble free arrangement for a number of reasons.

Operating principle remains unchanged, but in practice the rod is not designed to sweep out all resin from chamber 60 during shut off—rather, it merely shuts off resin flow (after having stopped catalyst flow) by coming home against the tapered conical surface 51, with a lapped fit assuring metal to metal contact at the edge of nozzle outlet 52.

Also, it might be noted that the FIGURE 5 form of the invention can be readily housed within a steel tube of one inch or less outside diameter, with the tube replacing rigid frame 64 and shielding the components against dirt, etc. It is quite possible that actuating linkage can be included within the tube envelope and extended to the rear, along with tube, for sufficient distance to make this design the answer to the problems now faced by those who are seeking a two component spraying device that can be used, in automatic equipment, to spray coat the inside of plastic bottles.

Therefore, although various forms of this invention have been disclosed herein, it is to be understood that changes in the details thereof may be made without departing from the spirit and the scope of the invention.

What is claimed is:

1. A spraying apparatus for mixing and spraying two separate pressurized fluid streams that form on mixing a thermosetting mass, which comprises in combination, a spraying nozzle having a combining compartment coaxially disposed therein about a longitudinal axis, said compartment having a front conically tapered portion terminating in a nozzle outlet and a rear cylindrical wall section of uniform cross section extending throughout the remaining length thereof, and further provided with inlets communicating therein for entrance of two separate pressurized fluid streams, a slidable reciprocating member disposed in said compartment communicating with the walls thereof substantially filling the said compartment when in its most forward position and provided with a channel therethrough communicating with an inlet to said channel when said reciprocating member is in its most rearward position, at which position a second inlet to said compartment is thereby opened, means for slidably moving said reciprocating member within the said compartment whereby on forward movement thereof one of said inlets becomes closed prior to the closing of the second inlet thereby permitting a purge of said compartment with only one of said fluid streams before both inlets become closed.

2. A spraying apparatus for mixing and spraying two separate pressurized fluid streams that form on mixing a thermosetting mass, which comprises in combination, a spraying nozzle having a compartment coaxially disposed therein about a longitudinal axis, said compartment having a front conically tapered portion terminating in a nozzle outlet and a rear cylindrical wall section of uniform cross section extending throughout the remaining length thereof, and further provided with inlets communicating therein for entrance of two separate pressurized fluid streams, one of said inlets being provided to the nozzled end of the compartment arranged so as to provide vorticular flow of fluid in the compartment and communicating with a first pressurized fluid supply means, a slidable reciprocating member disposed in said compartment communicating with the walls thereof substantially filling the said compartment when in its most forward position and provided with a substantially coaxial channel therethrough, a second pressurized fluid supply means communicating with an inlet to said channel, said inlet communicating with said channel when said reciprocating member is in its most rearward position, at which position the nozzle inlets to said compartment are open, means for slidably moving said reciprocating member within the said compartment whereby on forward movement thereof, one of said inlets becomes closed prior to the closing of the other inlet thereby permitting a purge of said compartment with only one of said fluid streams before both inlets become closed.

3. A spraying apparatus for mixing and spraying two separate pressurized fluid streams that form on mixing a thermosetting mass which comprises in combination, a spraying nozzle having a compartment coaxially disposed therein about a longitudinal axis, said compartment having a front conically tapered portion terminating in a nozzle outlet and a rear cylindrical wall section of uniform cross section throughout the remaining length thereof and provided with a nozzle inlet in said wall section defining a first inlet and adapted to provide vorticular flow of fluid in the compartment for connection with a first pressurized fluid supply means, a slidable conically tipped reciprocating member disposed in said compartment communicating with the walls thereof and substantially filling the said compartment when in its most forward position and provided with a substantially coaxial channel therethrough terminating at the apex of the conical tip of said reciprocating member, an inlet to said channel defining a second inlet and said inlet having connections for a second pressurized fluid supply means, said channel communicating with said inlet when said reciprocating member is in its most rearward position, at which position the nozzle inlets to said compartment are open, means for slidably moving said reciprocating member within the said compartment whereby on forward movement thereof, said second inlet becomes closed prior to the closing of said first inlet thereby permitting a purge of said compartment with the fluid stream entering said first inlet before both inlets become closed.

4. The apparatus as defined in claim 3 wherein means are provided for a final second purge of pressurized fluid through the second of said inlets to the compartment when the reciprocating member is at its most forward position mating with the conically tapered portion of the compartment.

5. A spraying apparatus for mixing and spraying two separate pressurized fluid streams that form on mixing, a thermosetting mass which comprises in combination, a spraying nozzle having a compartment coaxially disposed therein about a longitudinal axis, said compartment having a front conically tapered portion terminating in a nozzle outlet and a rear cylindrical wall section of uniform cross section through the remaining length thereof and provided with a nozzle inlet in said wall section entering tangentially thereinto to provide vorticular flow of fluid in the compartment for connection with a first pressurized fluid supply means, a slidable conically tipped reciprocating member disposed in said compartment communicating with the walls thereof and substantially filling the said compartment when in its most forward position and provided with a coaxial channel therethrough terminating at one end at the apex of the conical tip of said reciprocating member, means for slidably moving said reciprocating member within said compartment, said member being of sufficient length to close said nozzle inlet when the said member is in its most forward position, and at the opposite end thereof an opening to an annulus, said opening defining a channel inlet, said annulus being coaxial with the said member and adapted to seal said channel inlet when said member moves toward its most forward position at which position the nozzle inlet to said compartment remains open after said channel inlet is closed thereby permitting a purge of said chamber with the fluid stream entering the nozzle inlet before both inlets become closed.

6. The apparatus as defined in claim 5 wherein two separate pressure supply means for providing fluid streams under pressure are connected with and in communication with the two inlets.

7. The apparatus as defined in claim 5 wherein the annulus at the end of the reciprocating member comprises a ball-shaped spring-loaded plug and seat adapted to provide a final second purge of fluid through said reciprocating member and nozzle after both inlets become closed.

8. The apparatus as defined in claim 7 wherein two separate pressure supply means for providing fluid streams under pressure are connected to and in communication with the two inlets.

9. A spraying apparatus for mixing and spraying two separate pressurized fluid streams that form on mixing a thermoseting mass, which comprises in combination, a spraying nozzle having a combining compartment coaxially disposed therein about a longitudinal axis, said compartment having a front conically tapered portion terminating in a nozzle outlet and a rear cylindrical wall section of uniform cross section extending throughout the remaining length thereof, and further provided with inlets communicating therein for entrance of two separate pressurized fluid streams, a slidable reciprocating member disposed in said compartment communicating with the walls thereof substantially filling the said compartment when in its most forward position and provided with a channel therethrough terminating in an inlet to said compartment and communicating with a pressurized fluid supply means when said reciprocating member is in its most rearward position, at which position a second inlet to said compartment is thereby opened, means for slidably moving said reciprocating member within the said compartment whereby on forward movement thereof, one of said inlets becomes closed prior to the closing of the other inlet thereby permitting a purge of said chamber with only one of said fluid streams before both inlets become closed, and means for reopening said one of said inlets after said other inlet has closed thus providing for a final second purge of pressurized fluid through the said one of said inlets to the compartment when the reciprocating member is at its most forward position mating with the conically tapered portion of the compartment.

References Cited in the file of this patent
UNITED STATES PATENTS

| | | |
|---|---|---|
| 2,878,063 | Kish | Mar. 17, 1959 |
| 2,890,836 | Gusmer et al. | June 16, 1959 |
| 2,958,471 | Zippel | Nov. 1, 1960 |
| 3,027,096 | Giordano | Mar. 27, 1962 |
| 3,083,913 | Coffman | Apr. 2, 1963 |
| 3,087,682 | Peeps | Apr. 30, 1963 |

UNITED STATES PATENT OFFICE
CERTIFICATE OF CORRECTION

Patent No. 3,122,326            February 25, 1964

Dudley P. Cook

It is hereby certified that error appears in the above numbered patent requiring correction and that the said Letters Patent should read as corrected below.

Column 2, line 28, for "construction" read -- constriction --; column 12, line 74, for "thermoseting" read -- thermosetting --.

Signed and sealed this 4th day of August 1964.

(SEAL)
Attest:

ERNEST W. SWIDER            EDWARD J. BRENNER
Attesting Officer            Commissioner of Patents